US010171727B1

(12) United States Patent
Haynold

(10) Patent No.: US 10,171,727 B1
(45) Date of Patent: Jan. 1, 2019

(54) RESETTING SINGLE-CONTROL APPARATUS

(71) Applicant: Oliver Markus Haynold, Evanston, IL (US)

(72) Inventor: Oliver Markus Haynold, Evanston, IL (US)

(73) Assignee: Promanthan Brains LLC, Series Click only, Evanston, IL (US)

( * ) Notice: Subject to any disclaimer, the term of this patent is extended or adjusted under 35 U.S.C. 154(b) by 0 days.

(21) Appl. No.: 15/095,146

(22) Filed: Apr. 10, 2016

Related U.S. Application Data

(63) Continuation-in-part of application No. 13/902,934, filed on May 27, 2013, now Pat. No. 9,313,304.

(60) Provisional application No. 61/652,777, filed on May 29, 2012.

(51) Int. Cl.
G03B 17/18 (2006.01)
H04N 5/232 (2006.01)
H04N 5/235 (2006.01)

(52) U.S. Cl.
CPC ....... H04N 5/23216 (2013.01); H04N 5/2353 (2013.01); H04N 5/23212 (2013.01)

(58) Field of Classification Search
CPC ........... H04N 5/23216; H04N 5/23212; H04N 5/2353; H04N 5/23245; H04N 5/23241
See application file for complete search history.

(56) References Cited

U.S. PATENT DOCUMENTS

| 6,919,927 | B1 | 7/2005 | Hyodo |
| 7,085,590 | B2 | 8/2006 | Kennedy et al. |
| 7,295,242 | B2 | 11/2007 | Gotanda |
| 7,321,395 | B2 | 1/2008 | Gotanda |
| 7,406,331 | B2 | 7/2008 | Middleton |
| 7,738,029 | B2 | 6/2010 | Kobayashi |
| 7,881,759 | B2 | 2/2011 | Eaton |
| 7,912,519 | B2 | 3/2011 | Lee et al. |
| 8,237,807 | B2 | 8/2012 | Jones et al. |
| 8,531,539 | B2 | 9/2013 | Sasaki |
| 8,665,358 | B2 | 3/2014 | Cho et al. |
| 8,811,948 | B2 | 8/2014 | Bandyopadhyay et al. |
| 8,886,030 | B2 | 11/2014 | Misawa |
| 2001/0043279 | A1* | 11/2001 | Niikawa ................ H04N 5/232 348/335 |

(Continued)

OTHER PUBLICATIONS

HD2 Apps: HTC HD2 Apps: SciLor's Leo Camera Any Key v2.5, Jun. 6, 2010.

(Continued)

Primary Examiner — Ahmed A Berhan

(57) ABSTRACT

According to one embodiment, an image-taking apparatus wherein a first actuation of a control element locks image-taking parameters and a subsequent actuation of this control element causes a picture to be taken. In one embodiment, the apparatus is a cellular telephone equipped with a camera wherein a first press on the volume up button locks focus and exposure. The photographer can then recompose the picture according to the 'half-press' technique and take a picture with a subsequent press on the volume up button. The locked focus and exposure may be unlocked after a predetermined timeout period during which no picture was taken. Other embodiments are described.

49 Claims, 5 Drawing Sheets

(56) References Cited

U.S. PATENT DOCUMENTS

Figure 1:
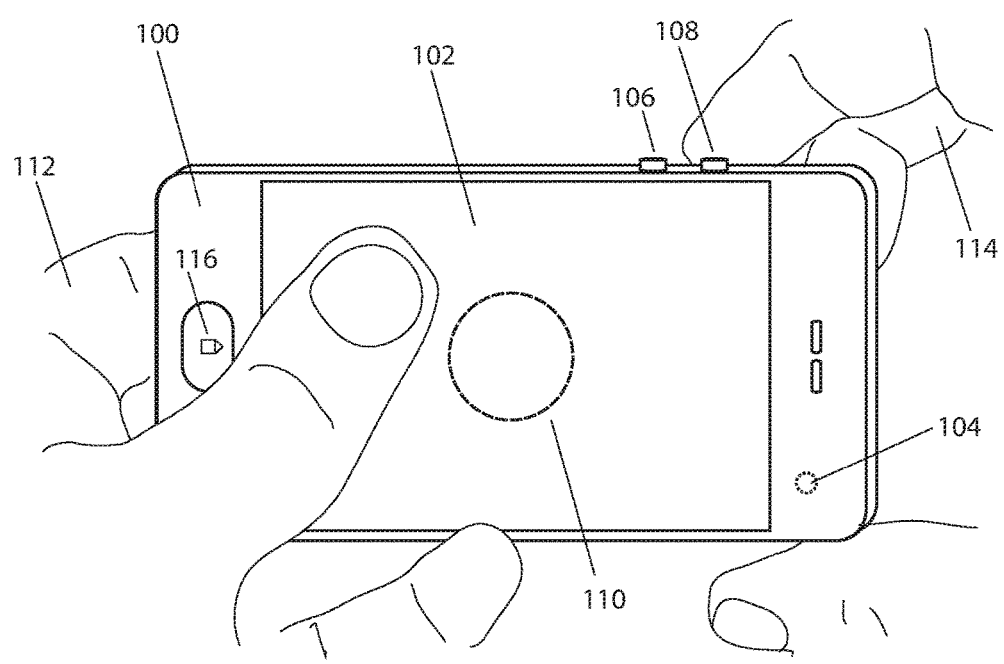

| | | | |
|---|---|---|---|
| 2006/0038912 A1* | 2/2006 | Tsukamoto | H04N 5/23248 348/345 |
| 2006/0045514 A1* | 3/2006 | Matsushita | G03B 17/18 396/299 |
| 2008/0146298 A1* | 6/2008 | Kwak | G06Q 20/102 455/575.4 |
| 2009/0097718 A1* | 4/2009 | Li | H04N 5/232 382/124 |
| 2011/0090313 A1 | 4/2011 | Tsuchita | |
| 2012/0032894 A1* | 2/2012 | Parivar | G06F 1/3215 345/173 |
| 2012/0120277 A1 | 5/2012 | Tsai | |
| 2014/0036128 A1 | 2/2014 | Young-Keun Choi | |

OTHER PUBLICATIONS

Use Volume Keys to Activate Camera Shutter—Pocketnow, Jun. 7, 2010.

SciLor's Camera Button Anykey, Jun. 5, 2010.

\* cited by examiner

RESETTING SINGLE-CONTROL APPARATUS

CROSS-REFERENCES TO RELATED APPLICATIONS

This application is a continuation-in-part of my patent application Ser. No. 13/902,934, filed on 27 May 2013, which claims the benefit of provisional patent application 61/652,777, filed on 29 May 2012 by the present inventor. The applications mentioned above are incorporated herein by reference.

BACKGROUND

Prior Art

The following is a tabulation of some prior art that presently appears relevant:

| Pat. No. | Kind Code | Title | Issue Date | Patentee |
|---|---|---|---|---|
| 6,919,927 | B2 | Camera with touchscreen | 2005 Jul. 19 | Manabu Hyodo |
| 7,085,590 | B2 | Mobile terminal with ergonomic imaging functions | 2006 Aug. 1 | Peter J Kennedy et al. |
| 7,295,242 | B2 | Electronic camera having a mode setting device | 2007 Nov. 13 | Yoshiharu Gotanda |
| 7,321,395 | B2 | Image capturing apparatus and method of setting exposure for AF control executed by image capturing apparatus | 2008 Jan. 22 | Yoshiharu Gotanda |
| 7,406,331 | B2 | Use of multi-function switches for camera zoom functionality on a mobile phone | 2008 Jul. 29 | David Desmond Middleton |
| 7,738,029 | B2 | Image-taking apparatus that shoots a still image when a release button is pressed | 2010 Jun. 15 | Koji Kobayashi |
| 7,881,759 | B2 | Shaped loudspeaker output in a communications handset | 2011 Feb. 1 | William Chris Eaton |
| 8,237,807 | B2 | Image capturing device with touch screen for adjusting camera settings | 2012 Aug. 7 | Jeremy Jones et al. |
| 8,531,539 | B2 | Image capturing device, method for image capturing, and computer readable recording medium | 2013 Sep. 10 | Masaaki Sasaki & Akira Hamada |
| 8,811,948 | B2 | Above-lock camera access | 2014 Aug. 19 | Shamik Bandyopadhyay et al. |
| 8,665,358 | B2 | Apparatus for processing an image having detachable lens and a ring for setting photographing parameter values | 2014 Mar. 4 | Woo-jong Cho et al. |
| 8,886,030 | B2 | Imaging apparatus with display and image display apparatus | 2014 Nov. 11 | Atsushi Misawa |

| application Ser. No. | Kind Code | Title | Publication Date | Applicant |
|---|---|---|---|---|
| 2011/0090,313 | A1 | Multi-eye camera and method for distinguishing three-dimensional object | 2011 Apr. 21 | Akiyoshi Tsuchita |
| 2012/0120,277 | A1 | Multi-point Touch Focus | 2012 May 17 | Richard Tsai |
| 2014/0036,128 | A1 | Method and apparatus for manual focusing in portable terminal | 2014 Feb. 6 | Young-Keun Choi |

BACKGROUND

In cameras equipped with automatic functions to set focus or exposure parameters, there has evolved a convention on how to set these parameters. Commonly, the shutter button on these cameras is built as a two-stage button. When the user depresses the shutter button partially, the camera selects certain image-taking parameters, such as focus, aperture, exposure time, or sensor sensitivity, to values depending on what is in the camera's field of view at that moment. Then these parameters get locked. Together, aperture, exposure time, and sensor sensitivity determine the exposure value of the image to be taken, a concept well known in the art. The user can then 'recompose' the picture by pointing the camera in a different direction while holding the shutter button partially depressed. When the user is ready to take the picture, he depresses the shutter button fully, and a picture will be taken with the image-taking parameters that have been previously locked. This is an intuitive user interface that provides the photographer much creative control. However, the need for the user's tactile differentiation between a light press for the first step and a firm press for the second step also presents challenges when the user's fine motor control is impaired, for example by cold weather, gloves, or disability.

The method of partially depressing a shutter button to set and lock image-taking parameters and fully depressing that same shutter button to take the picture, as well as the terminology of 'half press' and 'full press,' have become so widespread that U.S. Pat. No. 7,738,029 specifically teaches the use of a "release button [that] is a two-step type which lends itself to a half press and full press" in the context of a method to measure exposure.

Figure 5:
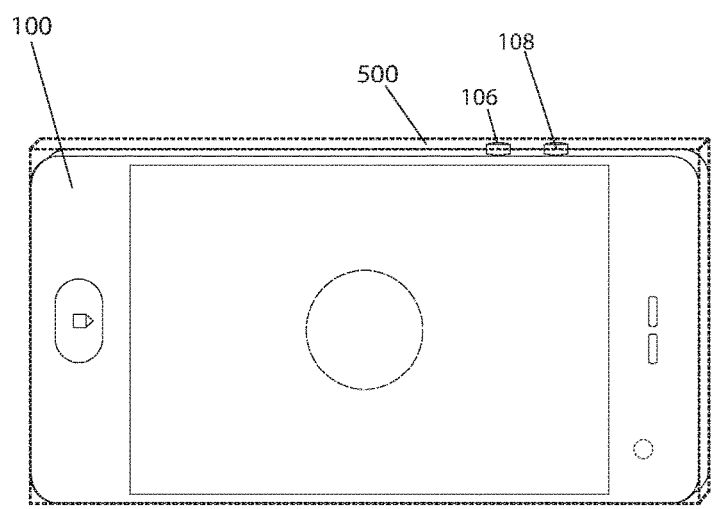

Recent years have seen the introduction of many multimedia devices, for example personal digital assistants, media players, and mobile telephones, that are also equipped with cameras capable of taking still images and/or videos. A few of these devices are equipped with a traditional two-step button specifically dedicated to use as a shutter button when the device is being used for taking pictures. However, this concept has not become very popular. In contrast to the traditional shape of dedicated cameras, many multimedia devices are more miniaturized and often have the shape of a very flat rounded cuboid. This makes is difficult to include a two-step button on the device's narrow lateral surfaces, which are the natural position for a shutter button. It is also harder for the user to feel the tactile difference between a half and a full press on a highly miniaturized button of a small multimedia device compared to the larger shutter button on a dedicated camera. FIG. 5 shows the flat cuboid shape of device 100 with the lowest-volume cuboid capable of enclosing the devices's shape and the two buttons 106 and 108 facing one of the cuboid's narrow faces.

Further, on a multimedia device where image taking is just one of many uses and not usually the primary one, it would be impractical to include a separate suite of buttons dedicated to image taking. U.S. Pat. No. 7,406,331 teaches the use of existing buttons normally used for communication functions on a mobile telephone equipped with a camera to control zooming the built-in camera and zooming pictures shown on the telephone's display. The benefit of this method is somewhat limited because most of the highly miniaturized cameras in mobile telephones do not have an optical zoom function. Adoption of this method appears to be limited if it has been adopted at all.

Instead, a different convention regarding the use of the volume buttons on mobile telephones has evolved. For example, recent versions of the popular iPhone®, made by Apple, Inc. of Cupertino, Calif., use the volume buttons as a shutter button. By pushing either volume button, the user can trigger an image to be taken.

U.S. Pat. No. 7,085,590 teaches the use of separate portrait and landscape display modes on mobile terminal devices with built-in camera functions.

We are now seeing the widespread adoption of touch-sensitive screens on mobile multimedia devices. A common method of setting exposure parameters on devices so equipped is by gestures to move the point of the picture which the autofocus should make sharpest or which the metering system should set aperture, exposure time, and/or sensitivity for. Shutter release is commonly accomplished by touching a specific area of the touchscreen or, less often, by pushing a button on the device. This method is counterintuitive for experienced photographers because instead of the traditional point/half press/recompose/full press sequence now one has to hold the device steady with one hand while making gestures on the screen with the other hand to set image-taking parameters and eventually take the picture. It is also difficult to hold the device steady with one hand between its narrow edges while making touch inputs on the screen with the other hand, in part because modern portable multimedia devices often are very narrow, making a steady hold difficult, and in part because the force of tapping on the screen is applied orthogonally to the force of the hand holding the device. This method of controlling exposure on a touch screen also makes use of this method very difficult for users that have use of only one hand, either because of disability or because they simply have their other hand occupied.

Thus, the methods of releasing the shutter on a camera known heretofore suffer from several disadvantages. The method commonly used for dedicated cameras requires a button with two separate contacts for half-press and full-press. Considerations of cost, size, and ergonomics make this approach impractical to implement in small multimedia devices such as cellular telephones. This method also is impractical when the user's tactile sensitivity is impaired by weather, gloves, or disability. The methods commonly used by the camera function on cellular telephones or other multimedia devices suffer from distinct disadvantages. They are counterintuitive for experienced photographers and demand that the device be held with one hand and the touchscreen manipulated with the other for setting image-taking parameters, which is difficult, time-consuming, and almost impossible to perform with one hand.

SUMMARY

In accordance with one embodiment, a portable multimedia device equipped with a camera and using a one-step button for shutter release and the same one-step button for locking focus and exposure, wherein the first press on the shutter release button locks focus and exposure and a subsequent press of said button takes the picture. The locked focus and exposure may be unlocked after a predetermined timeout period during which no picture was taken. Other embodiments are discussed.

Advantages

Several advantages of one or more aspects are as follows: to avoid the need for a separate two-step shutter button, to allow miniaturization of the device, to allow the setting of image-taking parameters and taking pictures while holding the device steadily with two hands, to reduce latency between shutter button press and shutter release, to make the image-taking workflow intuitive for experienced photographers, to make image-taking easier for users with temporarily or permanently impaired tactile or fine-motor skills, and to allow setting of exposure parameters with only one hand.

DRAWINGS—FIGURES

Figure 2:
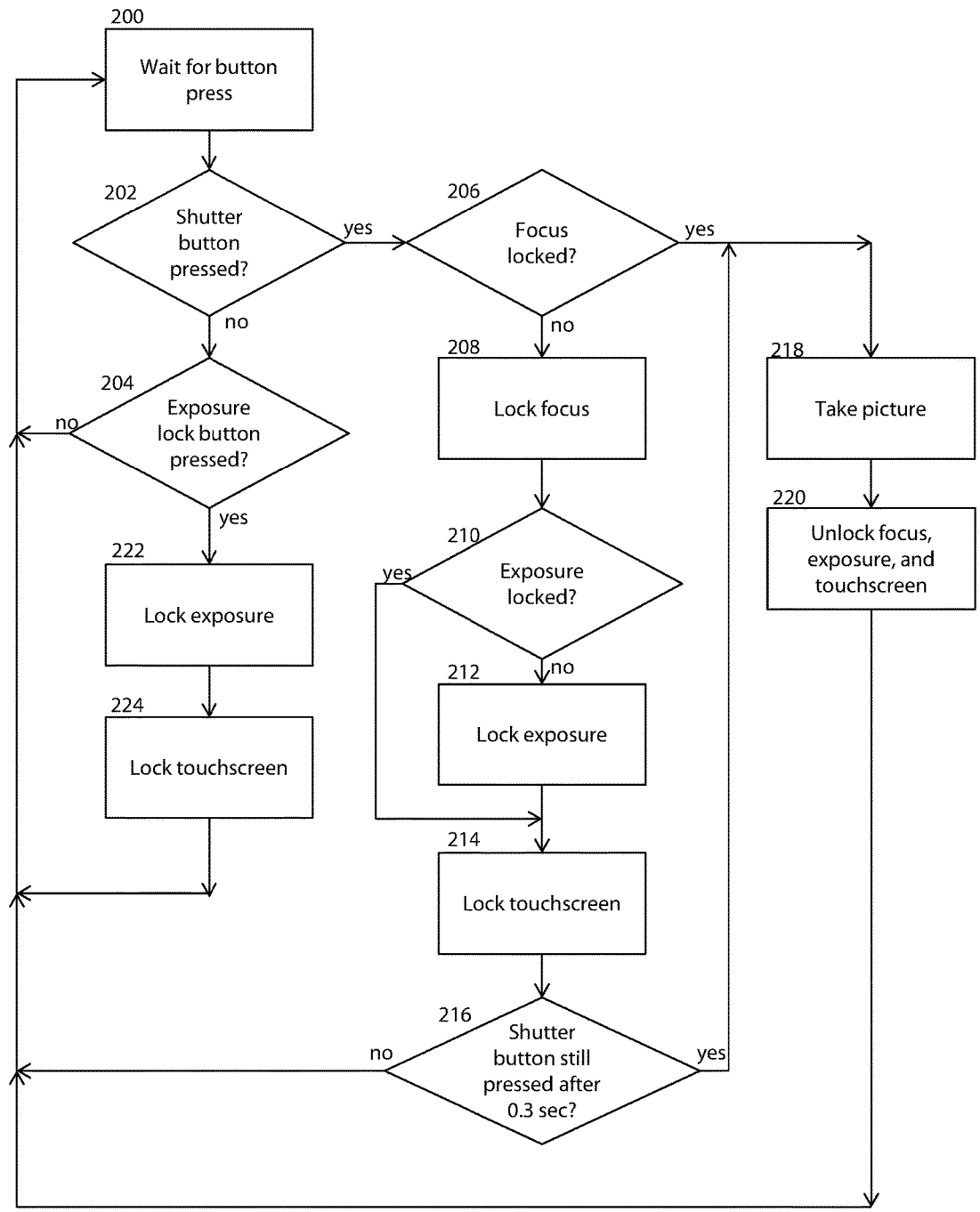
Figure 3:
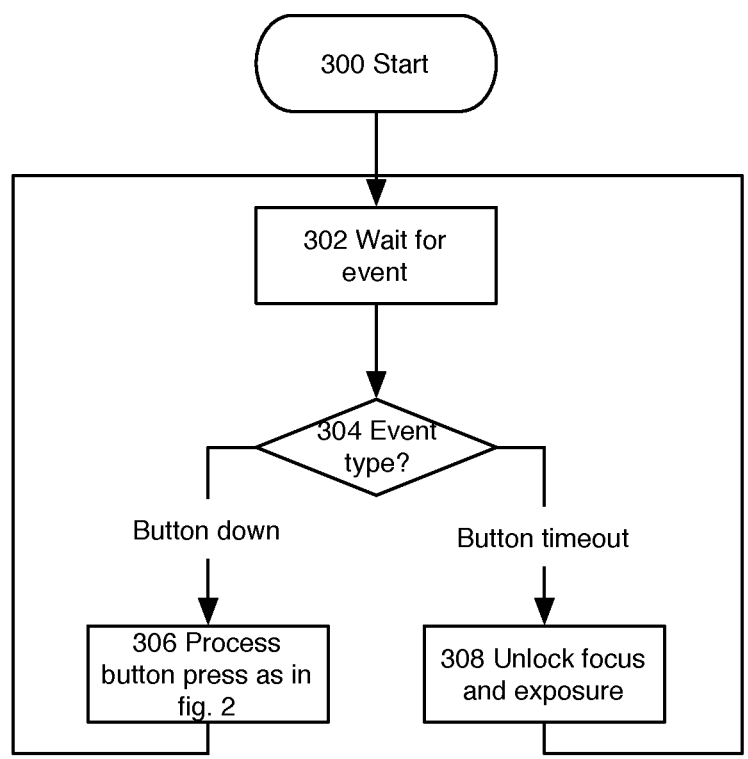
Figure 4:
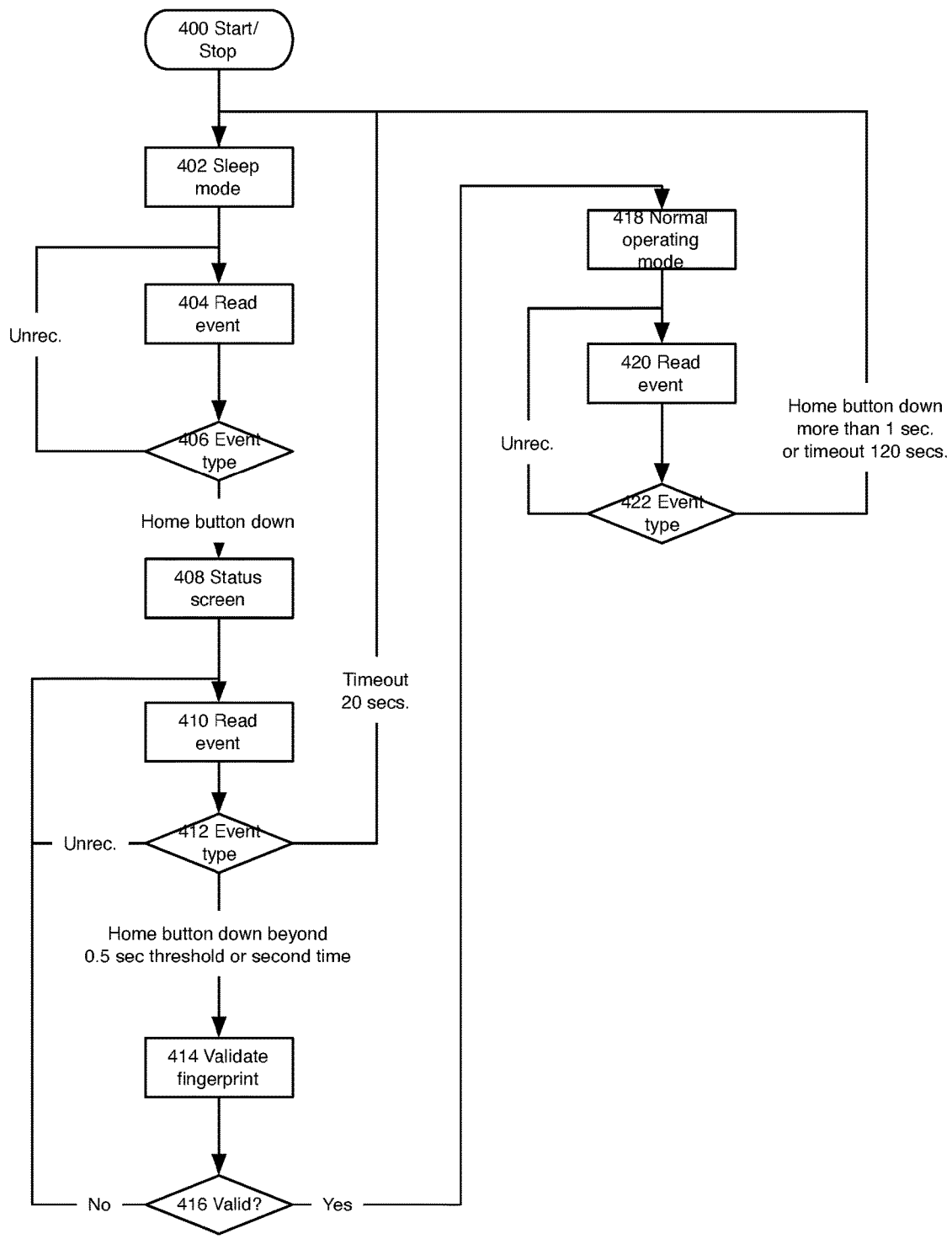

FIG. 1 shows an embodiment of the invention where the device is a cellular telephone FIG. 2 shows a flow chart of one embodiment of the invention FIG. 3 shows a flow chart of the second embodiment discussed FIG. 4 shows a flow chart of the third embodiment discussed FIG. 5 shows the smallest enclosing cuboid characterizing the shape of the device

DRAWINGS—REFERENCE NUMERALS

100 Cellular telephone
102 Touchscreen
104 Camera facing away from user
106 Volume down button
108 Volume up button
110 Center mark displayed on screen
112 User's left hand
114 User's right hand
116 Multifunction button
Numerals 200-224 are labeled on the flow chart
Numerals 300-308 are labeled on the flow chart
Numerals 400-422 are labeled on the flow chart
500 Smallest enclosing cuboid characterizing the shape of the device

DETAILED DESCRIPTION—FIGS. 1 AND 2—FIRST EMBODIMENT

One embodiment of the invention is illustrated in FIG. 1. A cellular telephone 100, or a multimedia device of a similar form factor, is equipped with a touch-sensitive screen ('touchscreen') 102, a camera facing away from the touchscreen 104, a volume down button 106 at the side of the telephone, and a volume up button 108 at the side of the telephone. It may also be equipped with additional buttons or other user interface elements not shown here. When the cellular telephone is set to a mode for picture-taking, a ring-shaped center mark 110 is displayed on its screen. The user holds the telephone, giving it stability with his left hand 112, and operating the volume down button 106 and volume up button 108 with his right hand while also stabilizing the phone with this hand. In camera mode, the volume down button 106 serves as the exposure-lock button and the volume up button 108 serves both as a lock-focus button and as a shutter button as explained next.

Operation Flow—FIGS. 1 and 2

It is assumed that the telephone has already been set to camera mode. This can be achieved by the user selecting a camera application on the telephone's touchscreen and is well known in the art. In camera mode, the touchscreen 102 displays the picture the camera sees currently (not shown in the drawing), a center mark 110, and possibly some additional information such as the currently selected exposure mode (not shown). Since the touchscreen may offer additional functionality by touching it, the user may still have to hold the telephone without touching the touchscreen at this point in time.

Moving to the control flow in FIG. 2, in the initial step 200 the telephone waits for a button press on either the volume down button 106 or volume up button 108. It might also respond to additional input on the touchscreen or by other control elements it is equipped with. The exposure and focus are not locked initially.

If the user depresses the volume up button 108 now serving as the focus-lock and shutter button, step 202 moves the control flow to step 206, which checks if the focus has already been locked. The first time the user presses the button, this will not be true because the focus is not locked initially. If the focus is not yet locked, the control flow will lock the camera focus in step 208 so that the part of the picture marked by the center marker 110 is in focus. It will also check in step 210 whether exposure has already been locked, and if this is not true it will lock exposure, too, in step 212, so that the part of the picture marked by the center marker 110 will be optimally exposed. It will also in step 214 lock the touchscreen 102, making it insensitive to touch input, and allowing the user to grasp the telephone firmly with both hands 112 and 114 without regard to touching the touchscreen.

Step 216 then checks whether the shutter button 108 has been depressed by the user for more than 0.3 seconds. If so, it takes a picture in step 218, releases the focus and exposure lock in step 220, and returns to the original state waiting for control input at step 200. The user moving his fingers away from the touchscreen after the exposure will not be taken as a touchscreen input. This 0.3 second delay means that the user can lock focus without taking a picture by a short press on the volume up button 108; on the other hand, a longer press on this button locks focus and then takes a picture. There is no appreciable loss of latency in the second case because the camera's autofocus needs about 0.3 seconds to set focus anyhow, whereas very low latency can be achieved in the first case since exposure and focus are already locked.

If the user depresses the shutter button 108 and step 206 finds that focus has already been locked, the camera immediately takes a picture in step 218, releases the focus and exposure lock in step 220, and returns to the initial state at step 200.

If the user depresses the volume down button now serving as the exposure-lock button 106, step 204 moves the control flow to step 222 causing the camera to lock exposure so that the part of the picture marked by the center marker 110 will be optimally exposed, locks the touchscreen 224, and continues to wait for a button press at step 200.

The multifunction button 116 may be assigned the same function as the volume button 108. Its arrangement collinear with the camera axis increases the risk of inadvertently rotating the camera, but because it is on the telephone's wide front and not its slim side, this button can be much larger than the volume buttons, which may simplify operation with gloves or for disabled users.

Locking the exposure value in steps 212 and 222 may be accomplished by automatically determining an optimal combination of aperture, exposure time, and sensor sensitivity for the part of the scene marked by the center marker 110. Alternatively, up to two of these three parameters may be set to predetermined values, and exposure value is then set by automatically determining an optimal combination of the remaining free parameters. For example, the camera's aperture may be set to a fixed value that cannot be changed and sensor sensitivity may be set to a given value by the user in the device's menu; in this case locking exposure value is accomplished by determining and locking an optimal value for the exposure time.

User Techniques—FIGS. 1 and 2

The control flow described above enables the user to employ several different techniques to take a picture, depending on the user's needs and skills and a given situation's tradeoff between speed and creative control.

Most simply, the user may employ the 'point-and-shoot' technique and point the camera at the object of interest in a scene so that the center marker 110 marks that object of interest, press the shutter button 108, and hold it down for more than 0.3 seconds. In this case, the camera will automatically lock focus in steps 200, 202, 206, and 208, lock exposure in steps 210 and 212, lock the touchscreen in step 214, take a picture in steps 216 and 218, and return to the original state in steps 220 and 200.

In a situation that requires more creative control, the user may employ the 'half-press technique' (thus called in the photographic literature because it is traditionally performed by depressing a shutter button halfway, even though in the present embodiment there is no half-press of the button). In this technique, the user points the camera at the object of interest so that the center marker 110 aligns with that object and briefly depresses the focus-lock/shutter button 108. Now the focus and exposure are locked so that the object of interest will be shown sharp and properly exposed once a picture is taken. The user can now recompose the picture by pointing the camera in a different direction so that the object of interest is no longer in the center of the picture. This may be aesthetically more pleasing or allow the user to move another element of secondary interest into the picture that would not have been visible with the object of primary interest in the center of the picture. It also means that the camera will not have to lock focus and exposure before taking a picture, which reduces the latency between a press of the shutter button and the picture being taken. When the user now presses the shutter button 108 again, a picture will be taken with low latency and with the object originally selected in focus and properly exposed.

A yet more sophisticated possibility is the 'exposure-lock' technique which the user may employ in situations with difficult lighting. For example, if the object of interest is very bright, the user may want to lock focus on that object, but lock exposure against some more neutral element in the scene. This can be achieved by lining the camera up so that the center marker 110 is lined up with an element of neutral brightness, ideally neutral grey, and depressing the exposure-lock button 106. Then the user proceeds with the 'half-press technique' or the 'point-and-shoot technique' as described above. In this way it is possible to take a picture where exposure is set to be optimal for one element of the picture, focus is set on a different element, and neither element necessarily has to be aligned with the center of the image.

Where the control flow locks exposure in steps 222 or 212, the camera may only lock aperture, exposure time, and sensor sensitivity, or it may also lock white balance in addition to those exposure parameters. Whether white balance is also locked may be set by the user in a menu.

Second Embodiment—FIG. 3

The second embodiment may be implemented on the hardware of a smartphone or multimedia device as shown in FIG. 1 and discussed in the first embodiment.

One disadvantage of the control logic shown in the first embodiment, shared with many other camera types that provide some means for the user to lock focus, exposure, or other image-taking parameters, is the possibility of the camera being inadvertently left in locked mode. For example, a user may see an interesting image-taking opportunity that requires, in order to obtain a good picture, to set focus or exposure manually using the half-press method. That requires some time, even though the time required is drastically reduced with the method disclosed above over some other methods known in the art, such as manipulating a focus ring or dragging one's finger on a touchscreen. It is thus possible that a fleeting opportunity to take a picture will have gone away by the time the user is finished locking exposure parameters and thus the user decides not to take the shot. In this case, the camera's exposure parameters will still be left locked. Now if some time later the user finds another opportunity for taking a picture, a press on the shutter button will take a picture with the previously locked exposure parameters. If the user does not notice this immediately, he might end up with a picture that is out of focus or otherwise taken with wrong parameters, and at any rate he will lose valuable time and might get confused.

The second embodiment solves this issue by adding logic that resets the locked exposure parameters if the user is not taking a picture within a predetermined time. FIG. 3 shows the control flow of this additional logic. After initialization in step 300, which may comprise allocating software resources, the camera waits for events in step 302. For our purposes this includes waiting for the user to press the shutter button 108 or the exposure lock button 106, though this step may also monitor and process additional events, such as touchscreen manipulations. Step 304 checks the type of event received and branches to appropriate processing in steps 306 for button presses, step 308 for button timeout events, and may also branch to alternative processing sequences for additional types of events monitored. Step 306 is the processing of button presses, either of the shutter button or the exposure lock button, shown in FIG. 2 and discussed in the first embodiment, starting with step 200 (where no waiting is necessary since when reaching this step from step 306 a button press has just occurred).

Step 308 is called in case of a button timeout. This event is generated by step 302 when the user has not pressed either the shutter or the exposure lock button for a predetermined amount of time that may be chosen to be sixty seconds. In order to generate this event, step 302 may set a variable to the time of the last button press received or timeout event generated and periodically check whether the current time is at least the predetermined amount of time larger than the time stored. If so, it generates the timeout event. The timeout event leads to step 308, which unlocks camera focus and exposure or other exposure parameters if they are currently locked. Thus if the user locks exposure parameters and then does not take a shot within a predetermined amount of time, the camera will automatically unlock the parameters again. The processing of timeout events in step 308 may also include additional steps. For example, it may limit the display brightness to a predetermined maximal value or reduce frequency of display refreshes to a predetermined value lower than the refresh frequency in normal operation in order to save energy; if so, the processing of step 306 may include steps to revert from these energy-saving settings to normal settings, such as restoring screen refresh frequency or restoring display brightness.

This method of operation is not limited to implementations where the exposure parameters are locked with a button. For example, it may also apply if a camera switches from autofocus to manual focus if the user manually manipulates the focus ring on a camera so equipped. If so, the camera may take this manipulation of the focus ring to switch off autofocus as if focus had been locked by a press or half-press, as the case may be on the given camera, of the shutter button. If the user then takes a picture within the predetermined time period, it will be taken with the manually set focus setting, but if the user does not take a picture within the predetermined time period, the camera will revert to autofocus operation.

The length of the predetermined timeout time period should be chosen with the use case for the type of camera in mind. For a consumer camera, such as the camera built into a cellular telephone, the time period may be relatively short, for example one minute. For a more professional camera where the user may be more likely to set up a shot and then wait patiently for the best time to take it, such as a digital single-lens reflex camera, the time period may more usefully chosen to be longer, such as ten minutes, so as not to lose settings inadvertently while the user is still preparing to take the shot.

Third Embodiment—FIG. 4

The third embodiment shows an aspect of the invention that reaches beyond image-taking to other applications where similar problems are relevant. The smartphone of the first embodiment shown in FIG. 1 may have a sleep mode where at least some components of the phone are powered on, but the display may be switched off and other energy-saving measures may be taken, such as reducing processor clock frequency or putting the processor to sleep mode and waking it up through event-driven or periodic interrupts for such background processing as may be useful, such as evaluating whether a wake-up alarm set by the user is due to be rung or processing incoming emails.

The phone of the third embodiment may have a status screen mode where the screen shows a summary of information the user may find relevant with a quick glance, such as a list of the most recent emails received, the current time, upcoming appointments, the current weather, recent transactions on a credit card owned by the user, and so on. Such data may be received through networking hardware installed in the phone from a server, using, for example, the HTTPS protocol with authentication through a cryptographic certificate. The server may be operated by the phone's manufacturer, the cell phone service provider, the user's organization, or a third party, and the phone may also be equipped to collect different data to display on the status screen from different servers. For example, the phone may obtain calendar information from a calendar server specified by the user, email information from an email server, and information about financial transactions, such as credit card charges or securities purchases, from different servers of financial institutions the user has accounts with.

This status screen provides the user the convenience of a quick summary of recent and upcoming events of interest without being intrusive. In the case of displaying financial information, it also provides a quick way to alert the user of transactions so that he can recognize fraudulent transactions as early as possible and take appropriate steps, such as initiating a chargeback with his financial institution. In order to make it easier to recognize possibly fraudulent transactions, software on the financial institution's server or on the phone may assign different scores of likelihood of fraud to different transactions, and transactions with higher scores may be highlighted, for example though use of a different text color or bolder typeface. For example, transactions with higher amounts may be assigned a higher score due to the increased risk of financial damage. The phone may also receive information about the location at which a transaction was entered from the financial institution and compare this with current or historical location data collected by the phone, for example through a GPS receiver built into the phone or through location services provided by triangulation between cell phone towers. In this case, the phone may calculate a high score for likelihood of possible fraud if a transaction was physically entered, such as by swiping a credit card, at a substantial distance from the location where the phone was at the time of the transaction, on the theory that typically the phone and the credit card both move with the user. The score may in turn be lowered if the phone at the time of the transaction was resting for a substantial time, such as exceeding fifteen minutes, at the same place. For the determination whether the phone was resting, the phone may keep a history of motion data collected by micromechanical acceleration and rotation sensors as well as location history from triangulation. A transaction may be assigned a high score if it is implausible that the user traveled between the last time and place before, or the first time and place after, the transaction when he moved or used his phone and the time and place of the transaction. For example, if a user used his phone in New York at a given time and then his credit card was swiped in Chicago an hour later, it is highly implausible that the user moved between New York and Chicago at that speed, and it becomes even less plausible if half an hour later he continues using his phone in New York. If the phone recognizes such a highly implausible transaction, it may display a special alert to the user outside of the status screen and/or alert the user by means such as sound or vibration. This approach makes it possible to use the phone's location data to determine the plausibility of financial transactions without revealing all of the user's location data from the phone to the financial services providers since the transaction plausibility is being evaluated on the phone, not on the financial service provider's server. The software for determining this plausibility of a transaction may be built into the phone, provided by a third party, or provided by the financial service provider, for example as an "app" a user may install on his phone for additional protection. The same logic may be used to determine the plausibility of similar events that should be tied to the user being present at a given place and where the user not being present indicates a possibility of fraud. For example, a home monitoring system may send data to the phone every time the phone owner's code is entered to disarm the home alarm. If it turns out that the user is with his phone in a different location, the phone may alert a home monitoring company and the user. The phone may also show the last times the user entered his access credentials on an electronic home or office door lock, a safe, etc. on the status screen. In this way, the user would be alerted if, for example, his children or domestic staff opened a safe containing documents or firearms, even if no abuse could be detected because the user or his phone were in approximately the same location. The status screen may also display current electricity prices and alerts when such prices, for example due to locational marginal prices being high or because an upcoming time period will likely count toward a peak charge, exceed a given threshold, or show users alerts that, for example, their air conditioning system has been shut off due to high electricity demand. Again, the phone may compare its current location with the location of the event. For example, the phone may permit an air conditioning shutoff due to increased, but not extreme, electricity prices when the user is a certain distance away from his home, but override it if the user is in or nearby his home.

In addition to the status screen, the phone has a normal operating mode that may comprise a screen showing a menu of different "apps" and for each "app" one or more screens to interact with the phone, such as the screen for taking pictures discussed in the first embodiment. Such menus and screens for different "apps" as well as simpler versions of the status screed discussed are well known in the art.

The phone may be adapted to allow the user to switch the phone from the sleep mode to the status screen and to the normal operating mode through the button 116 in FIG. 1. Button 116 may be equipped with a fingerprint sensor that will only recognize a button actuation as valid if the user's fingerprint matches one of a set of fingerprints previously trained by the user. This switching and validation of fingerprints is known in the art and not uncommon in modern smartphones.

A previously unsolved problem is whether to put the phone into the status screen or into the normal operating mode when the user actuates the button 116, or a button in a different location adapted to the same purpose, such as a power button on the side. On many current phones, actuating the button 116 briefly flashes the status screen as soon as the user presses the button 116 and then switches to the normal operating mode screen once the user's fingerprint has been recognized a short instant of time later. This makes it impractical for the user to access the status screen in a casual way without switching out of the status screen into normal operating mode.

Similar logic as used in the first and second embodiments provides a useful solution to this problem as shown in FIG. 4. The control flow starts at node 400 and assumes the phone initially is to be in the sleep mode but may be modified to use any of the other two modes as the initial mode. Step 402 puts the phone in sleep mode, blanking the display and/or displaying a screen saver or certain basic information such as time and date and possibly taking other energy-saving measures such as reducing processor clock frequency, reducing data interface data and/or polling rates, powering down auxiliary processors such as GPUs, etc. Steps 404 and 406 comprise an event loop, with step 404 listening for events such as button 116 being actuated, timer and network events, etc. and step 406 deciding on how the event will be processed. If the event is unrecognized, it is ignored by reentering the event loop. Other events not shown here, such as the arrival of a timer notification or network message may be processed here, as is known to those skilled in the art. If the event read is an actuation of the home button 116, control flow proceeds to step 408.

Step 408 shows the status screen. For this, it activates the screen and displays summary information as discussed above. This summary information may periodically be updated through a network interface even when the phone is in sleep mode so that it is always current when the phone enters the status screen. Steps 410 and 412 comprise an event loop similar to the one of steps 404 and 406, and again events not discussed here may be processed appropriately. If a timer event indicates that the phone has displayed the status screen for a predetermined time that may be 20 seconds, control flow may return to step 402, bringing the phone back into sleep mode. This time may be extended by other events, such as the user interacting with the status screen, for example though touchscreen inputs. If the user either releases and then presses again the button or simply holds it for more than a predetermined time that may be 0.5 seconds, control flow proceeds to step 414. The alternative of either a double engagement of the button or a continued actuation provides impatient users immediate access through a double-click that is easily committed to muscle memory while also providing the easy option of simply holding the button down. Step 414 validates the user's fingerprint using a fingerprint sensor that may be built into button 116. If this validation fails, control flow goes back to the event loop of step 410, possibly with displaying an error message on the screen. If the validation succeeds, i.e., the fingerprint is recognized as matching a list of authorized fingerprints, control flow proceeds to step 418.

Button 116 may also have additional functions beyond those discussed here. For example, an actuation of button 116 may take a picture in certain operating modes, display a menu of available applications in certain operating modes, display a task manager in certain operating modes, and so on. For this purpose, button 116 may also distinguish between different patterns of actuation, such as single clicks, clicks exceeding a certain time, double clicks, and so on. Button 116 may be a mechanical button with a tactile click, a capacitive button, a light proximity sensor, a touch report from a fingerprint sensor, or any other suitable control element known in the art.

Step 418 is the phone's normal operating mode. This may comprise a menu screen that lets the user access different applications, often called "apps," such as a telephony application or the camera mode discussed in the first embodiment. Again, there is an event loop of steps 420 and 422. This event loop may process many different events, such as screen gestures on a touchscreen, and the event loop may process different events for different applications in use or other modes. If the user holds the home button 116 down for more than a predetermined time that may be one second or if the user does not interact with the phone for more than a predetermined time that may be 120 seconds, control flow may return to the sleep mode in step 402, preserving battery charge as well as protecting user privacy. The timeout may be prevented from operating when the user is using an application where it is to be expected that the user is still watching the screen even though no user input in being made, for example when watching a movie on the phone.

Those skilled in the art will see that the method of interacting with the home button 116 of this embodiment provides the user with a convenient way to activate both the status screen and the normal operating mode, depending on whether the user wants a quick status update or a more extensive interaction, with the same benefits and conveniences as discussed for the application in a camera in the first and second embodiments.

Additional Embodiments

There are various possibilities with regard to the physical layout of the user controls and the control flow governed by them. In one embodiment, instead of a physical button, the image-taking apparatus's touch screen 102 is used for locking image-taking parameters and taking pictures, taking the function of the volume up button 108 in the first embodiment. This allows the user to touch anywhere on the screen to lock parameters and to take a picture instead of having to touch very precisely the area for which image-taking parameters are locked and then a small area of the screen that serves as the shutter button. Thus, the whole screen can serve as a button for setting image-taking parameters and taking a picture, which may be particularly suitable for disabled users or highly miniaturized devices. A small part of the screen marked with a "Done" button or a button on the device may be used to exit the camera mode.

In another embodiment, the apparatus, which may be a digital single-lens reflex camera or a compact camera, is equipped with a separate shutter button that is equipped with an ordinary half-press function where in normal operation depressing this button partially locks image-taking parameters and depressing it fully causes a picture to be taken. A special setting on the image-taking apparatus allows the half-press function to be disabled and then the apparatus uses the control flow of the first embodiment where the first full press on the shutter button locks exposure parameters and a subsequent press causes the picture to be taken, with the full-press function of the camera's shutter button taking the function the volume up button 108 in the first embodiment and the camera's exposure-lock button, if so equipped, taking the function of the volume down button 106 in the first embodiment.

In a further embodiment, the control flow of the first embodiment is changed so that the volume up button 108 always causes an image to be taken and the volume down button 106 always causes focus, exposure, and white balance to be locked. This allows less creative control than the first embodiment but may be more intuitive for inexperienced photographers, and still makes it easy for the user to set focus and exposure without moving his hands.

Advantages

From the description above, a number of advantages of some embodiments of my image-taking apparatus become clear:

(a) It is possible to use the 'half-press technique,' which many experienced photographers find intuitive, on devices not equipped with shutter buttons that can distinguish a half press from a full press.
(b) Since one-stage control buttons without a half-press function are much cheaper than two-stage buttons, manufacturing costs get reduced.
(c) A button where a two-stage tactile feedback would be unintuitive, such as a volume button on a cellular telephone, can be repurposed as a shutter button for the half-press technique.

(d) The photographer can use the intuitive action of pointing the camera in the direction of interest to set the area of the image for which image-taking parameters are to be locked instead of having to work a touch screen, cursor keys, or other less intuitive methods.
(e) The apparatus is particularly suitable in situations with reduced motor control, such as with gloves, in the cold, or for users with a physical impairment, or when a touch screen is unreliable, such as in the rain, since only one button needs to be pressed for most operations.
(f) It becomes much quicker to set image-taking parameters and take a picture since the photographer's finger can rest on the shutter button instead of having to search for other control elements.
(g) Whereas pushing an area of the touchscreen would rotate the direction in which the camera is looking, possibly causing motion blur, the push of the button is orthogonal to the camera's lens axis.
(h) The apparatus can be firmly held with two hands.
(i) If the apparatus needs to be held by one hand it is still possible to set focus and exposure quickly and intuitively.
(j) The user is protected against the camera being left unintentionally with locked exposure parameters if he locks such parameters but does not take a picture.

CONCLUSION, RAMIFICATIONS, AND SCOPE

Accordingly, the reader will see that the image-taking apparatus described here can be used to allow photographers used to the half-press technique to take pictures of high quality on a device that is not equipped with a two-stage shutter button or when the two-stage shutter button would be impractical to use. It becomes possible to hold the apparatus firmly with both hands, with the hands remaining in the same position, to set image-taking parameters quickly by pointing the apparatus at the relevant part of the picture to be taken, and to take a picture.

Although the description above contains many specificities, these should not be construed as limiting the scope of the embodiments, but merely as providing illustrations of some of several embodiments. A reader skilled in the art will see that the physical buttons of the embodiments discussed could be replaced by any other control element capable of operation as a momentary on switch, such as a touch screen, slider, one side of a volume rocker button, an optical proximity switch, remote control, etc.

Similarly, a reader skilled in the art will see that the image-taking parameters to be set are not constrained to focus and exposure and to the particular arrangement of button functions shown in FIGS. 1 and 2. For example, focus could be set manually and two buttons would be used in the way described above to set white balance and exposure rather than exposure and focus. Also, a press on the shutter button need not cause one picture to be taken immediately but might trigger the release of another of the 'drive modes' well-known in the art such as taking a picture after a delay, continuously taking pictures as long as the button is pressed, taking a 'bracket' of several pictures, a motion picture, etc. Even though a cellular telephone equipped with a touchscreen has been used in the description of the first embodiment, the apparatus need not be a telephone, for example it could be a multimedia player, and need not be equipped with a touchscreen.

The center mark 110 need not be fixed at the screen's center. In some embodiments it may be moved around by the user, such as by dragging it on the touchscreen, to a different location, and then focus and exposure will be locked to whatever the center mark in its new position is pointing at during the moment that these parameters are being locked.

Thus the scope of the embodiments should be determined by the appended claims and their legal equivalents, rather than by the examples given.

I claim:

1. A portable apparatus comprising a clock for outputting a time reference:
    characterized by having a flat shape, said flat shape being characterized by having a lowest-volume enclosing rectangular cuboid that belongs to the group of rectangular cuboids capable of enclosing said shape and that has the lowest volume of all members of said group, said lowest-volume cuboid having the three dimensions of length, width, and depth, where said length is greater than or equal to said width and said width is greater than said depth, and where said depth is no more than eighteen percent of said width; and
    having at least one control assembly facing out of said apparatus toward one of said lowest-volume rectangular cuboid's narrow faces, said narrow faces being the ones where one of said narrow face's dimensions is said depth;
    said apparatus being adapted:
    to perform a first predetermined action upon actuation of said control assembly when said apparatus is in an initial state;
    upon said predetermined action to transition to a second state;
    to perform a second predetermined action upon actuation of said control assembly if said apparatus is in said second state, said second predetermined action being substantively different from said first predetermined action and said second predetermined action being not only a return to said initial state; and
    to transition from said second state back to said initial state if said control assembly is not being actuated for a predetermined amount after the apparatus entered said second state.

2. The apparatus of claim 1 where said apparatus is a portable computer.

3. The apparatus of claim 1 where said initial state is an energy-saving mode.

4. The apparatus of claim 1 where said apparatus transitions from said second state back to said first state upon performing said second predetermined action.

5. The apparatus of claim 1 where said apparatus is a smartphone.

6. The apparatus of claim 1 where said apparatus is primarily intended for use as a camera.

7. The apparatus of claim 1 wherein said control assembly is a button.

8. The apparatus of claim 7 wherein said button is a volume button.

9. The apparatus of claim 1 wherein an actuation of said control control assembly for more than a predetermined time limit is taken as a subsequent actuation, said time limit being chosen so that a user may conveniently either release said control assembly before said time limit expires or continue actuating said control assembly until said time limit expires.

10. The apparatus of claim 1 where said first predetermined action sets an image-taking parameter of a camera.

11. The apparatus of claim 10 where said image-taking parameter is camera focus.

12. The apparatus of claim 10 where said image-taking parameter is camera exposure.

13. The apparatus of claim 1 where said apparatus also comprises a display and said second state displays a status screen on said display.

14. An apparatus comprising a camera, a clock for outputting a time reference, at least one locking control, and at least one shutter control:
said locking control and said shutter control being arranged so that is is possible to actuate said shutter control without simultaneously actuating said locking control; and
said apparatus being adapted
to lock at least one image-taking parameter upon actuation of said locking control;
to take a picture using said locked image-taking parameter if a user actuates said shutter control within a predetermined time period as measured by said time reference; and
to unlock said image-taking parameter if said user does not actuate one out of a group of at least one control elements within said predetermined time period.

15. The apparatus of claim 14 where said locking control and said shutter control are the same control and said apparatus is adapted to interpret actuation of said control sometimes as actuation of said locking control and sometimes as actuation of said shutter control depending on a state stored in said apparatus.

16. The apparatus of claim 14 where said locking control and said shutter control are two distinct controls.

17. The apparatus of claim 14 where said image-taking parameter is camera focus.

18. The apparatus of claim 14 where said image-taking parameter is camera exposure.

19. The apparatus of claim 14 where said apparatus is a portable computer.

20. The apparatus of claim 14 where said apparatus is a smartphone.

21. The apparatus of claim 14 where said apparatus is primarily intended for use as a camera.

22. The apparatus of claim 14 wherein said locking control and said shutter control are buttons.

23. The apparatus of claim 22 wherein said buttons are volume buttons.

24. A portable apparatus comprising a binary control element and a display, and having a sleep mode, a status mode, and a normal operating mode:
said binary control element being characterized by having exactly two mutually exclusive user interaction states, actuated and non-actuated, and being adapted so that an actuation by a user transitions said binary control element from said non-actuated state to said actuated state; and
said apparatus being adapted
to blank said display or show a predetermined set of information on said display when said apparatus is in said sleep mode;
to show a predetermined set of information different from what is shown in said sleep mode when said apparatus is in said status mode;
to allow user interaction and display information different from what is shown in said sleep and status modes when said apparatus is in said normal operating mode;
said sleep, status, and normal operating modes being mutually exclusive at any given time;
said apparatus being further adapted to
transition from said sleep mode to said status mode upon a first actuation of said binary control element; and
transition from said status mode to said normal operating mode upon a second actuation of said binary control element.

25. The apparatus of claim 24 where said second actuation requires first a release and then a subsequent actuation of said binary control element.

26. The apparatus of claim 24 where said apparatus also comprises a clock for outputting a time reference and where a continuous actuation of said binary control element exceeding a predetermined length of time, as determined by said time reference, is taken as said second actuation of said binary control element.

27. The apparatus of claim 24 where said apparatus is a smartphone.

28. The apparatus of claim 24 where said apparatus also comprises a sensor adapted to validate a user's identity and at least one of said transitions is contingent upon said user's identity to be confirmed to belong to a predetermined set of authorized users.

29. The apparatus of claim 28 where said sensor adapted to validate a user's identity is a fingerprint sensor.

30. The apparatus of claim 29 where said fingerprint sensor is integrated with said binary control element into a button.

31. The apparatus of claim 28 where said sensor adapted to validate a user's identity is a biometric sensor.

32. The apparatus of claim 24 where said apparatus is further adapted to transition from said status mode to said sleep mode after a predetermined time has elapsed.

33. The apparatus of claim 24 where said apparatus is a portable computer.

34. The apparatus of claim 24 where said apparatus is primarily intended for use as a camera.

35. The apparatus of claim 24 wherein said binary control assembly is a button.

36. The apparatus of claim 35 wherein said button is a volume button.

37. A method for controlling a camera, comprising:
reading the actuation status of at least one locking control and of at least one shutter control;
locking at least one image-taking parameter upon actuation of said locking control;
taking a picture using said locked image-taking parameter if a user actuates said shutter control within a predetermined time period as measured by a clock for outputting a time reference; and
unlocking said image-taking parameter if said user does not actuate one out of a group of at least one control elements within said predetermined time period;
where said locking control and said shutter control are arranged on an apparatus so that is is possible to actuate said shutter control without simultaneously actuating said locking control.

38. The method of claim 37 where said locking control and said shutter control are the same control, and said method also comprising receiving a state and interpreting actuation of said control sometimes as actuation of said locking control and sometimes as actuation of said shutter control depending on said state.

39. The method of claim 37 where said locking control and said shutter control are two distinct controls.

40. The method of claim 37 where said image-taking parameter is camera focus.

41. The method of claim 37 where said image-taking parameter is camera exposure.

42. A method for controlling a display, comprising:

blanking said display or showing a predetermined set of information on said display when the apparatus containing said display is in a sleep mode;

showing a predetermined set of information different from what is shown in said sleep mode when said apparatus is in a status mode;

allowing user interaction and displaying information different from what is shown in said sleep and status modes when said apparatus is in a normal operating mode;

transitioning from said sleep mode to said status mode upon a first actuation of a binary control element; and transitioning from said status mode to said normal operating mode upon a second actuation of said binary control element;

where said sleep, status, and normal operating modes are mutually exclusive at any given time; and where said binary control element is characterized by having exactly two mutually exclusive user interaction states, actuated and non-actuated, and is adapted so that an actuation by a user transitions said binary control element from said non-actuated state to said actuated state.

43. The method of claim 42 where said second actuation requires first a release and then a subsequent actuation of said binary control element.

44. The method of claim 42 further comprising reading a time reference, where a continuous actuation of said binary control element exceeding a predetermined length of time, as determined by said time reference, is taken as said second actuation of said binary control element.

45. The method of claim 42 also comprising validating a user's identity using a sensor and executing at least one of said transitions contingent upon said user's identity being confirmed to belong to a predetermined set of authorized users.

46. The method of claim 45 where said sensor adapted to validate a user's identity is a biometric sensor.

47. The method of claim 45 where said sensor adapted to validate a user's identity is a fingerprint sensor.

48. The method of claim 47 where said fingerprint sensor is integrated with said binary control element into a button.

49. The method of claim 42 further comprising transitioning from said status mode to said sleep mode after a predetermined time has elapsed.

* * * * *